(12) United States Patent
Gleason (10) Patent No.: US 12,263,459 B2
(45) Date of Patent: Apr. 1, 2025

(54) COMPOSITION AND METHOD TO FORM A COMPOSITE CORE MATERIAL

(71) Applicant: Composite Technologies International, LLC, Anniston, AL (US)

(72) Inventor: Stephen S. Gleason, Burr Ridge, IL (US)

(73) Assignee: Composite Technologies International, LLC, Anniston, AL (US)

( * ) Notice: Subject to any disclaimer, the term of this patent is extended or adjusted under 35 U.S.C. 154(b) by 869 days.

(21) Appl. No.: 17/475,503

(22) Filed: Sep. 15, 2021

(65) Prior Publication Data

US 2022/0001349 A1 Jan. 6, 2022

Related U.S. Application Data

(63) Continuation of application No. 16/221,856, filed on Dec. 17, 2018, now abandoned.

(60) Provisional application No. 62/599,442, filed on Dec. 15, 2017.

(51) Int. Cl.
| | |
|---|---|
| *C08J 9/18* | (2006.01) |
| *B01J 13/14* | (2006.01) |
| *B29C 35/02* | (2006.01) |
| *B29C 41/00* | (2006.01) |
| *C08J 9/32* | (2006.01) |
| *C08K 5/101* | (2006.01) |
| *C08K 7/20* | (2006.01) |
| *C08K 7/28* | (2006.01) |
| *C08K 9/10* | (2006.01) |
| *C08L 27/06* | (2006.01) |
| *C08L 33/14* | (2006.01) |

(52) U.S. Cl.
CPC ............. *B01J 13/14* (2013.01); *B29C 35/02* (2013.01); *B29C 41/00* (2013.01); *C08J 9/18* (2013.01); *C08J 9/32* (2013.01); *C08K 5/101* (2013.01); *C08K 7/20* (2013.01); *C08K 7/28* (2013.01); *C08K 9/10* (2013.01); *C08L 27/06* (2013.01); *C08L 33/14* (2013.01); *C08J 2333/08* (2013.01); *C08J 2367/00* (2013.01)

(58) Field of Classification Search
CPC .......... B01J 13/14; B29C 35/02; B29C 41/00; B32B 3/26; B32B 5/024; B32B 5/20; B32B 5/245; B32B 2250/03; B32B 2250/40; B32B 2255/26; B32B 2262/0269; B32B 2262/101; B32B 2262/106; B32B 2264/0228; B32B 2264/025; B32B 2264/101; B32B 2264/107; B32B 2264/12; B32B 2266/0221; B32B 2266/0264; B32B 2307/3065; B32B 2307/50; B32B 2605/08; B32B 2605/12; B32B 2605/18; B32B 2607/00; C08J 9/18; C08J 9/32; C08J 2201/026; C08J 2333/06; C08J 2333/08; C08J 2367/00; C08K 5/101; C08K 7/16; C08K 7/20; C08K 7/22; C08K 7/28; C08K 9/10; C08L 27/06; C08L 33/14

See application file for complete search history.

(56) References Cited

U.S. PATENT DOCUMENTS

| | | |
|---|---|---|
| 3,764,247 A | 10/1973 | Garrett |
| 4,272,850 A | 6/1981 | Rule |
| 4,595,623 A | 6/1986 | Du Pont |
| 5,242,637 A | 9/1993 | Inoue |
| 5,254,598 A | 10/1993 | Schlameus |
| 5,498,645 A | 3/1996 | Mariano |
| 5,665,461 A | 9/1997 | Wong |
| 5,665,785 A | 9/1997 | McClellan |
| 6,545,066 B1 | 4/2003 | Immordino, Jr. |
| 7,037,865 B1 | 5/2006 | Kimberly |
| 7,150,915 B2 | 12/2006 | Kia |
| 8,915,996 B2 | 12/2014 | Novak |
| 9,217,072 B2 | 12/2015 | Novak |
| 2006/0199456 A1 | 9/2006 | Taylor |
| 2008/0287575 A1 | 11/2008 | Terry Lee |
| 2009/0004459 A1 | 1/2009 | Kipp |

(Continued)

FOREIGN PATENT DOCUMENTS

| | | |
|---|---|---|
| DE | 3121225 A1 | 12/1982 |
| RU | 2665001 C1 * | 8/2018 |

(Continued)

OTHER PUBLICATIONS https://hal.archives-ouvertes.fr/hal-01102122; Polymer Foaming with Chemical Blowing Agents: Expirement and Modeling; Jose Antonio Reglero Ruiz; Oct. 16, 2015.

(Continued)

*Primary Examiner* — John M Cooney (74) *Attorney, Agent, or Firm* — Neustel Law Offices (57) ABSTRACT

A composition and method to form a composite core material for use as a panel, molded product, sheet, or reinforcing material. The composition generally includes a microsphere discontinuous portion disposed in a continuous encapsulating portion, such as an encapsulating resin. Final products made with the composition may also comprise a mesh assembly on one or both sides of a sheet or panel, and may comprise a scored panel or sheet such that a plurality of reinforcing blocks or sections are formed which allow the cured product to conform to, and reinforce, irregular shapes and surfaces.

20 Claims, 9 Drawing Sheets

(56) References Cited

U.S. PATENT DOCUMENTS

2014/0023833 A1* 1/2014 Futterman ................. B32B 7/12
428/190
2018/0155521 A1 6/2018 Gleason, Sr.

FOREIGN PATENT DOCUMENTS

| WO | 9533953 A2 | 12/1995 |
| WO | 03097344 A1 | 11/2003 |

OTHER PUBLICATIONS

International PCT Search Report for PCT Application No. PCT/US2018/65972; May 1, 2019.

* cited by examiner

COMPOSITION AND METHOD TO FORM A COMPOSITE CORE MATERIAL

CROSS REFERENCE TO RELATED APPLICATIONS

The present application is a continuation of U.S. application Ser. No. 16/221,856 filed on Dec. 17, 2018, which claims priority to U.S. Provisional Application No. 62/599,442 filed Dec. 15, 2017. Each of the aforementioned patent applications is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a composition and method to form a composite core material, and for testing the compressive strength of the material.

Related Art

Any discussion of the related art throughout the specification should in no way be considered as an admission that such related art is widely known or forms part of common general knowledge in the field.

A composite material (also called a composition material or shortened to composite) is a material made from two or more constituent materials with significantly different physical or chemical properties that, when combined, produce a material with characteristics different from the individual components. The new material may be preferred for many reasons: common examples include materials which are stronger, lighter, or less expensive when compared to traditional materials.

Transportation, construction and aerospace are the largest market segments within the composites industry recently, representing 62 percent of its total value. Development of low-cost, light weight, and high-strength composite material to be used in those industries is important.

SUMMARY

An example embodiment is directed to a composition and method to form a composite core material. The composition and method to form a composite core material includes solid or hollow microspheres mixed with an encapsulating material, so that, when hardened, a lightweight structure, such as a panel, may be formed that retains the high strength of the encapsulating material. The encapsulating material may comprise a resin, such as a polyester resin, a vinyl ester resin, or a fire retardant resin, or any combination of such resins.

There has thus been outlined, rather broadly, some of the embodiments of the composition and method to form a composite core material in order that the detailed description thereof may be better understood, and in order that the present contribution to the art may be better appreciated. There are additional embodiments of the composition and method to form a composite core material that will be described hereinafter and that will form the subject matter of the claims appended hereto. In this respect, before explaining at least one embodiment of the composition and method to form a composite core material in detail, it is to be understood that the composition and method to form a composite core material is not limited in its application to the details of construction or to the arrangements of the components set forth in the following description or illustrated in the drawings. The composition and method to form a composite core material is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

An example composition and method to form a composite core material, and products made from the material generally comprises compositions of a composite core material, methods to form such compositions, methods to form a composite product with such compositions, and methods to test the compressive strength of such compositions.

B. Microspheres

As shown in the Figures and described in example embodiments, microspheres 16 may be encapsulated in a resin material to create sheets, panels, or molded structures, for example. Solid or hollow plastic microspheres 16 are small spherical plastic, ceramic or glass, etc. particles. The microspheres typically consist of a polymer shell encapsulating a gas (if they are hollow). When the gas inside the shell is heated, it increases its pressure and the thermoplastic shell softens, resulting in a dramatic increase in the volume of the microspheres 16. In certain embodiments, when fully expanded, the volume of the microspheres increases more than about 40 times. Glass microspheres 16 are microscopic spheres of glass manufactured for a wide variety of uses in research, medicine, consumer goods and various industries. Glass microspheres 16 are usually between 1 and 1000 micrometers in diameter, although the sizes can range from 100 nanometers to 5 millimeters in diameter. Hollow or solid glass microspheres, sometimes termed microballoons or glass bubbles, have diameters ranging from 10 to 300 micrometers. In example embodiments, the microspheres 16 disposed in an encapsulating material, such as resin, may be either hollow or solid.

Solid microspheres are known and usable to make lightweight and strong composite panels or other structures, as is also true of hollow microspheres. In certain embodiments, glass or ceramic spheres may be used to form the microsphere discontinuous portions of products. Some glass spheres comprise soda lime borosilicate glass and synthetic amorphous crystalline-free silica. In some example embodiments, microspheres are made of acrylic and PVC.

C. Encapsulating Resin

In example embodiments, a composite core material 12 is made by introducing microspheres 16 into an encapsulating resin mixture 15, which may be comprised of resin and other materials, and then allowing the resin mixture to cure to form panels, scored sheets, or molded parts exhibiting the lightweight, high-strength, and insulating properties that are useful in making parts for the transportation and other industries.

In some example embodiments, a continuous encapsulating resin 15 is a polymerized product of polyester resins having a structure of:

wherein n is from about 3 to about 6. This is just one example of a fire retardant resin 15 and is not meant to be limiting as other fire retardant resins may be used.

In other embodiments, the continuous encapsulating resin 15 is a polymerized product of vinyl ester resins having a structure of:

wherein n is 1 to about 2, where $R_1$ is hydrogen or alkyl, $R_2$ is hydrogen or alkyl, $R_3$ is hydrogen or alkyl, $R_4$ is hydrogen or alkyl.

In yet other embodiments, the continuous encapsulating resin 15 is a polymerized product of a combination of the polyester resins and the vinyl ester resins. The weight percentage of the polyester resin ranges from about 5% to about 95%, e.g., 5%, 10%, 15%, 20%, 25%, 30%, 35%, 40%, 45%, 50%, 55%, 60%, 65%, 70%, 75%, 80%, 85%, 90% or 95%. The weight percentage of the vinyl ester resin ranges from about 95% to about 5%, e.g., 95%, 90%, 85%, 80%, 75%, 70%, 65%, 60%, 55%, 50%, 45%, 40%, 35%, 30%, 25%, 20%, 15%, 10%, or 5%.

In some example embodiments, the composite core material also comprises a blowing agent, or is formed through the use of a blowing agent. A blowing agent can be a substance which is capable of producing a cellular structure via a foaming process in a variety of materials that undergo hardening or phase transition, such as polymers, plastics, and metals. They are typically applied when the blown material is in a liquid stage. The cellular structure in a matrix reduces density, increasing thermal and acoustic insulation, while increasing relative stiffness of the original polymer. In some embodiments, the blowing agent may be a chemical blowing agent. In other embodiments, the blowing agent may be a physical blowing agent. In yet other embodiments, the blowing agent can be a combination of a chemical and physical blowing agent.

In another example embodiment, the composite core material 12 comprises glass fibers.

The weight percentages of the microspheres 16 that make up a discontinuous portion, and the continuous encapsulating resin mixture 15 in the composite core material 12 can vary. In some embodiments, the composite core material 12 comprises about 1% to about 10% by weight of the microsphere discontinuous portion and about 90% to about 99% by weight the continuous encapsulating resin 15. In other embodiments, the composite core material 12 further comprises about 1-2% by weight of the blowing agent. In some embodiments, the composite core material comprises about 1-10% by weight of microspheres. In certain embodiments, the composite core material has a density of 0.25 to about 3.00 lbs./ft$^3$. The thickness of the composite core products may typically range from about ⅛ inches to about 4 inches, although other thicknesses are possible as well.

D. Making the Composite Core Material and Product

Figure 1:
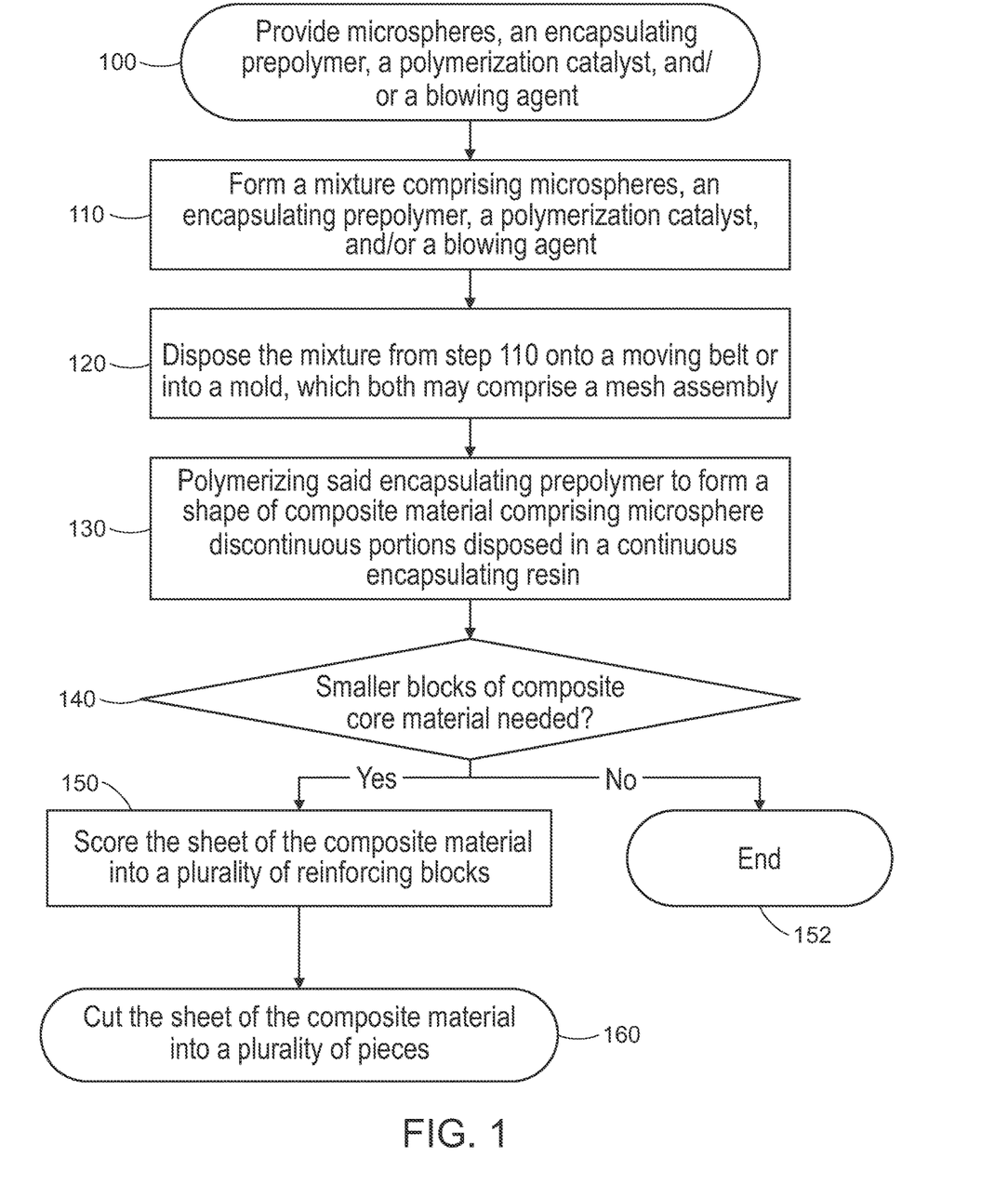
FIG. 1 is a flow chart for forming a composite core material in accordance with an example embodiment.

FIG. 1 summarizes an example method for making the composite core material 12. Referring to FIG. 1, in step 100, microspheres 16, an encapsulating prepolymer, a polymerization catalyst, and/or a blowing agent are provided. In some embodiments, polyester resins 15 are used. In other embodiments, vinyl ester resins 15 are used. In yet other embodiments, styrene-based resins 15 are used. In yet other embodiments, a mixture of polyester and vinyl ester resins are used. In yet other embodiments, fire retardant resins 15 are used. In some embodiments, a polymerization catalyst is 2-Butanone peroxide, having a structure of 2-Butanone peroxide has a molecular weight of about 210.22 and a density of about 1.053 g/ml at 20° C. In other embodiments, any catalyst known to a person in the art that can facilitate the polymerization of the encapsulating resin to encapsulate the discontinuous hollow or solid microsphere portions can be employed.

In step 110, all the materials provided in step 100 are mixed to form a first mixture comprising microspheres, the encapsulating prepolymer, and the polymerization catalyst. In certain embodiments, the polymerization catalyst has a concentration of about 1% to 2% by weight in a second mixture of the encapsulating prepolymer and the polymerization catalyst. The weight percentage of the polymerization catalyst can be about 1%, 1.25%, 1.5%, 1.75%, 2% or any other weight percentage that ranges from about 1% to about 2%.

In step 120, the first mixture comprising microspheres, an encapsulating prepolymer, and a polymerization catalyst is poured onto a moving belt. In other embodiments, the first mixture may be poured into a mold 20 (such as a closed mold), which contains a mesh assembly 14 or reinforcing material inside the mold, for example, in or near the bottom of the mold. The mesh assembly 14 may comprise a layer of fiberglass scrim, woven roving, or other reinforcing materials.

In certain embodiments, a moving belt is heated to facilitate the polymerization of the encapsulating prepolymer. In certain embodiments, the mesh assembly 14 lays on top of the moving belt and the first mixture is spread evenly over the mesh assembly.

In some embodiments, the mesh assembly has a width of 20 inches to 60 inches. In other embodiments, the mesh assembly has a width of 24 inches. In other example embodiments, the mesh assembly is a fiberglass mesh assembly, comprising fiberglass scrim. In yet other embodiments, other suitable materials known to a person skilled in the art can be used to make the mesh assembly.

Figure 11:
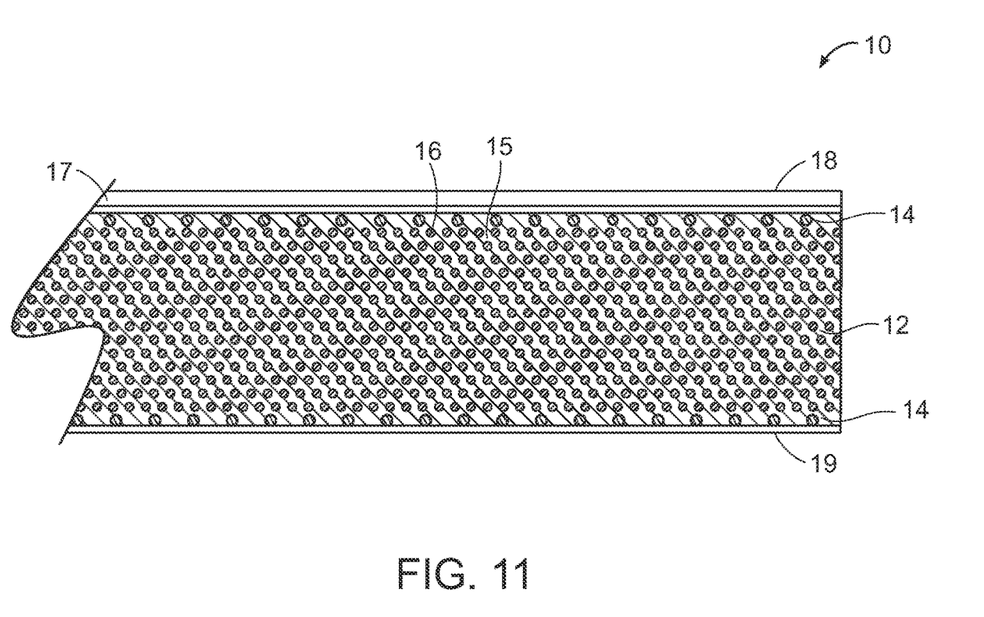
FIG. 11 is a sectional view of a composite panel in accordance with an example embodiment.

In step 130, when the first mixture is disposed onto a moving belt, the first mixture is spread evenly over the mesh assembly 14. In some example embodiments, a second mesh assembly 14 may be placed over the mixture after it is applied, so that the cured composite core material 12 will form a sheet or panel 10 with the cured composite core material 12 substantially between two layers of mesh 14 near each flat surface, as shown in FIG. 11. When the first mixture is cured, the encapsulating prepolymer is polymerized to form a sheet of composite core material 12 comprising microspheres 16, comprising discontinuous portions disposed in a continuous encapsulating resin 15. In certain example embodiments, the sheet of composite core material may have a thickness of about 0.125 inches to about 4 inches.

Figure 6:
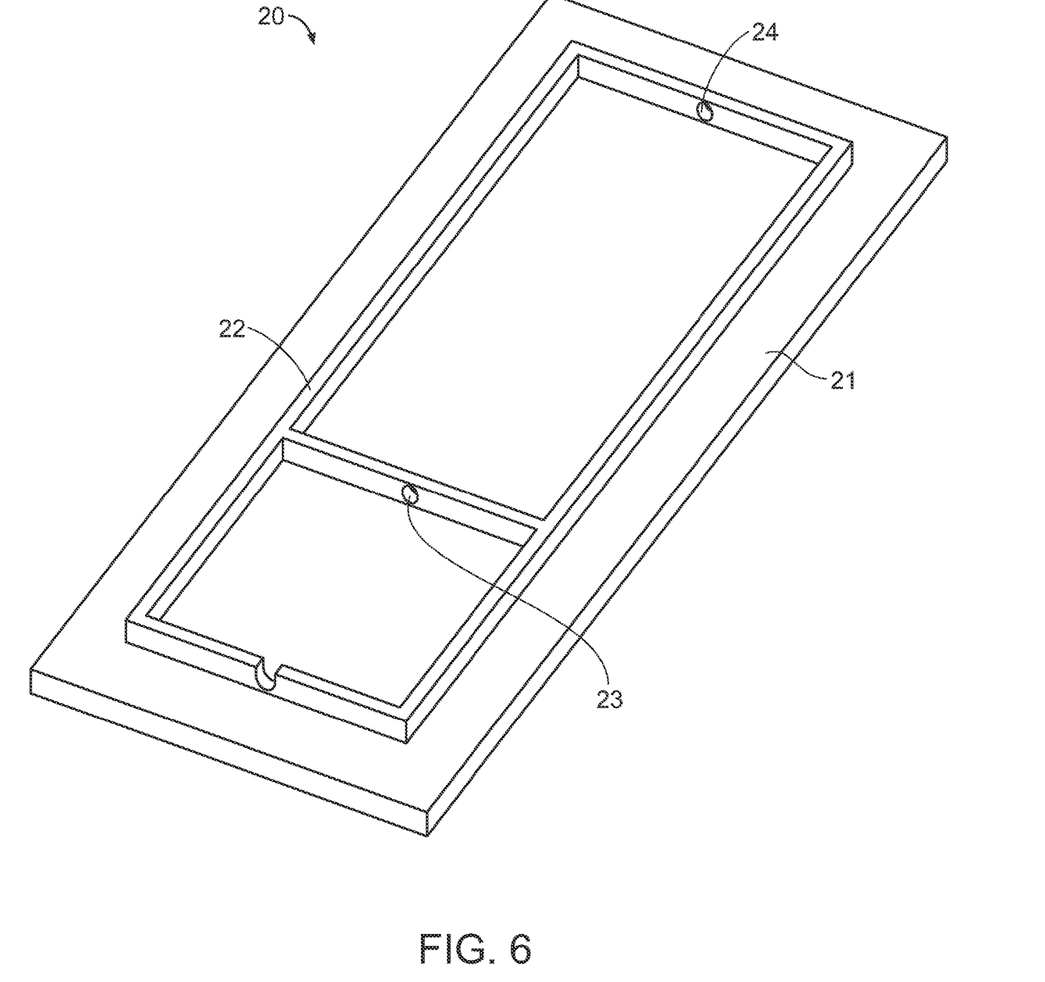
FIG. 6 is a perspective view of a mold body usable for making a composite panel in accordance with an example embodiment.
Figure 7:
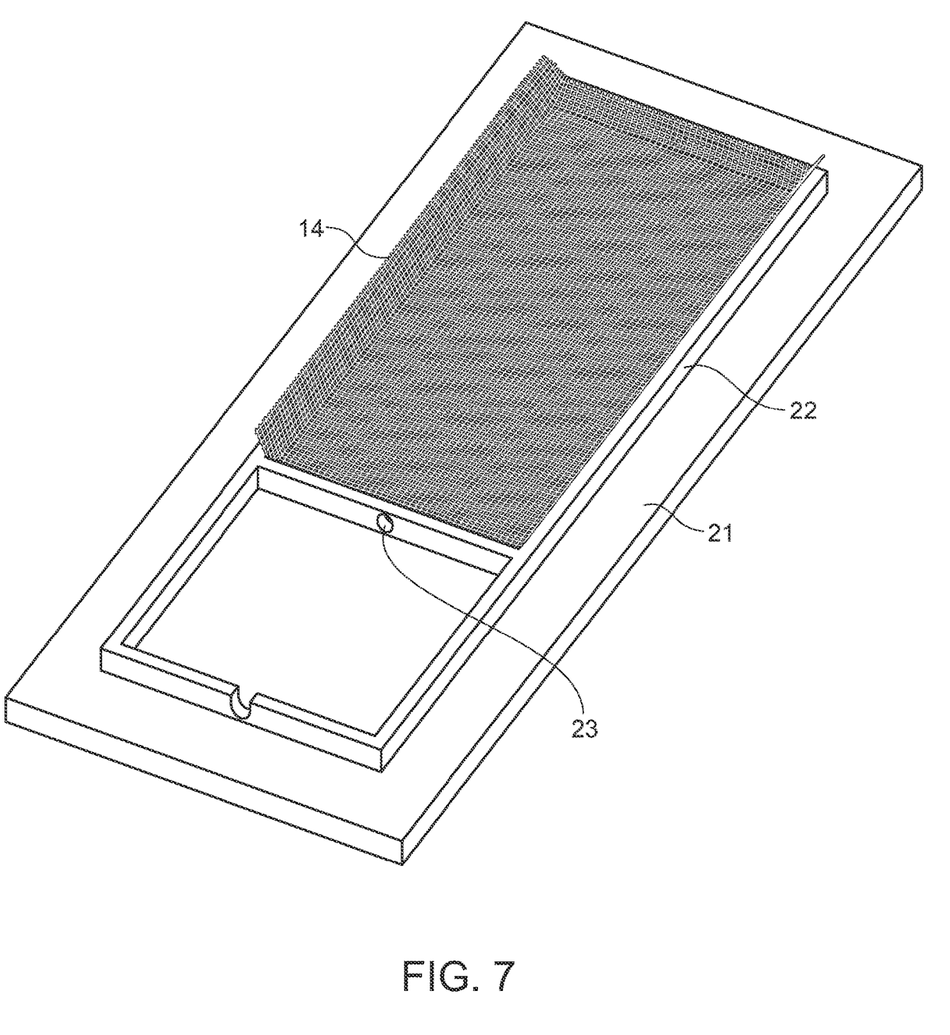
FIG. 7 is a perspective view of a mold body with a mesh assembly in place, usable for making a composite panel in accordance with an example embodiment.
Figure 8:
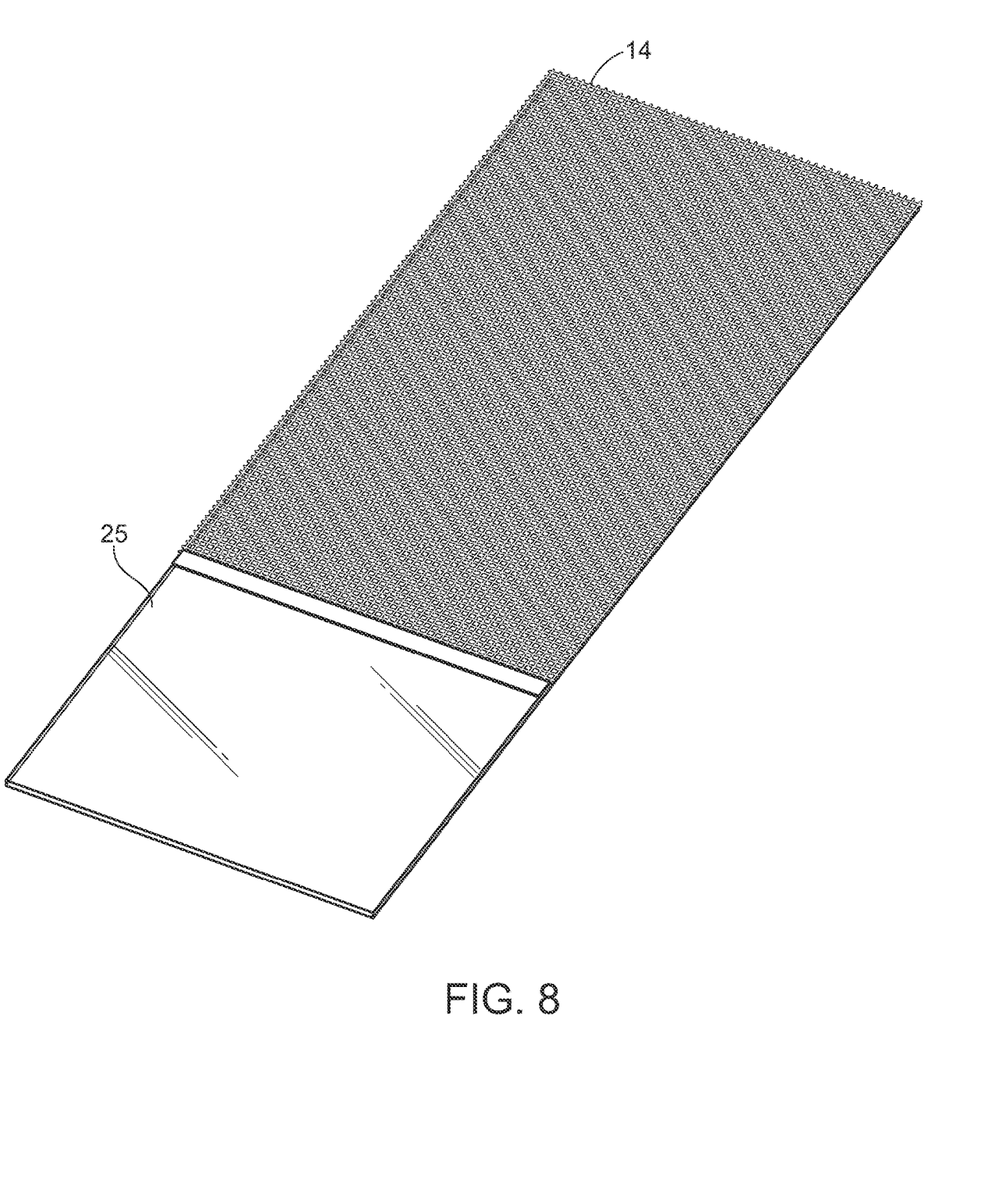
FIG. 8 is a perspective view of a mold top with a reinforcing layer in place, usable for making a composite panel in accordance with an example embodiment.

As discussed above, in addition to a moving belt, the panels 10 may also be created in a closed mold 20, such as the mold shown in FIG. 6. The mold comprises a mold body 22 that rests on a mold bottom 21. The mold body 22 may be made of silicone or similar material to aid in removing the cured panels from the mold, since many matrix materials will not adhere to silicone. Initially, a mesh assembly or reinforcing layer 14, such as fiberglass scrim, is installed in the portion of the mold in which the panel will be formed, as shown in FIG. 7.

As is known, a mesh assembly 14 adds strength to composite panels, as with many composite construction techniques where a matrix material surrounds and encapsulates a reinforcing material.

Figure 9:
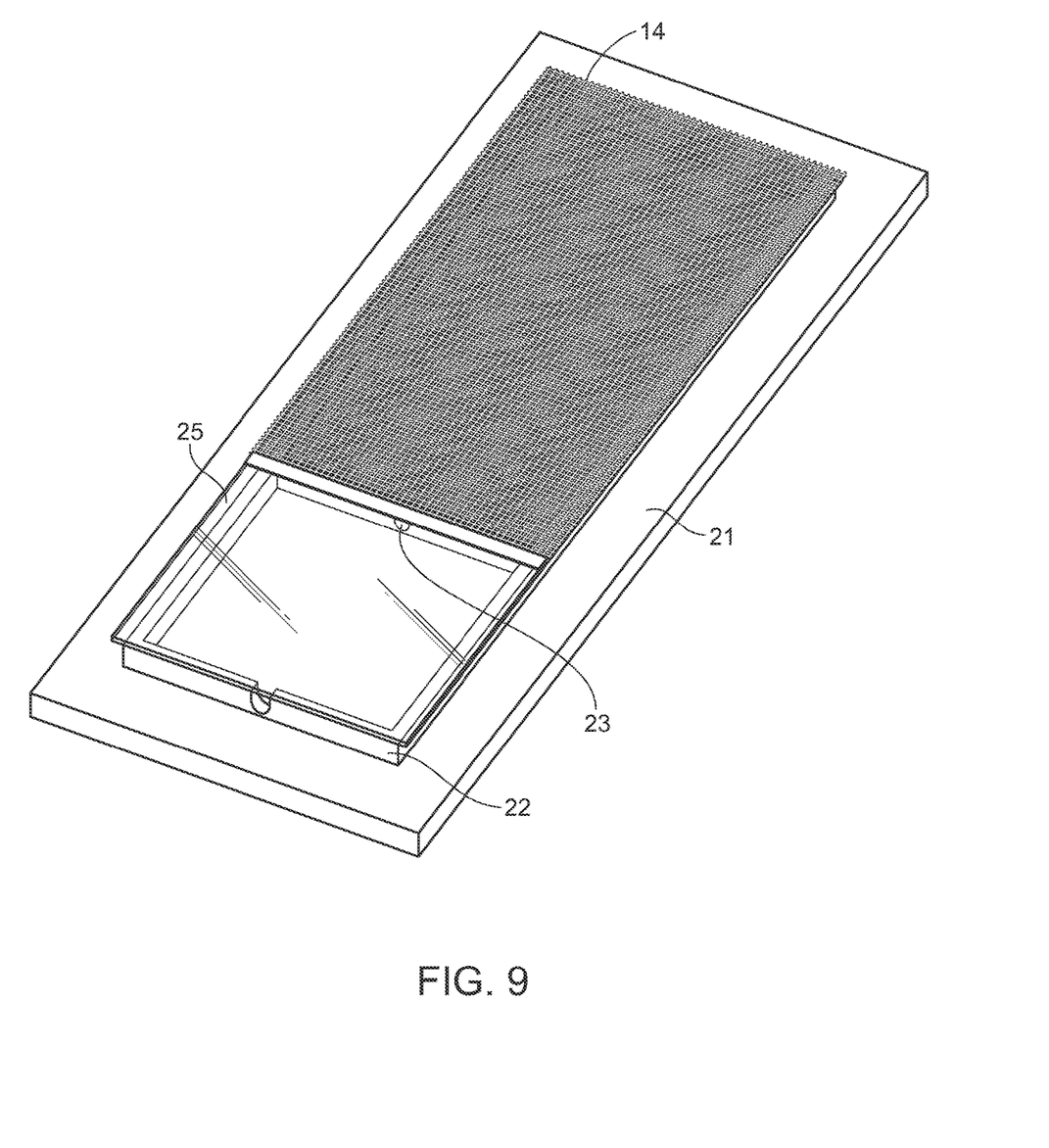
FIG. 9 is a perspective view of a mold bottom, mold body, and mold top in place, usable for making a composite panel in accordance with an example embodiment.

If desired, another mesh assembly 14 may be installed on a mold top 25, which may be a glass top to allow users to view the process and ensure quality. Alternatively, the second mesh assembly 14 may be omitted, which would be the case if a panel 10 is to be scored for reinforcing irregular surfaces or components as described herein. FIG. 9 illustrates an example embodiment of a fiberglass scrim mesh assembly installed on a mold top 25 prior to placement on the mold body 22. Next, the mold top 25 is placed on the mold body 22 with the other reinforcing layer 14, if used, positioned as needed to form a panel 10.

Figure 10:
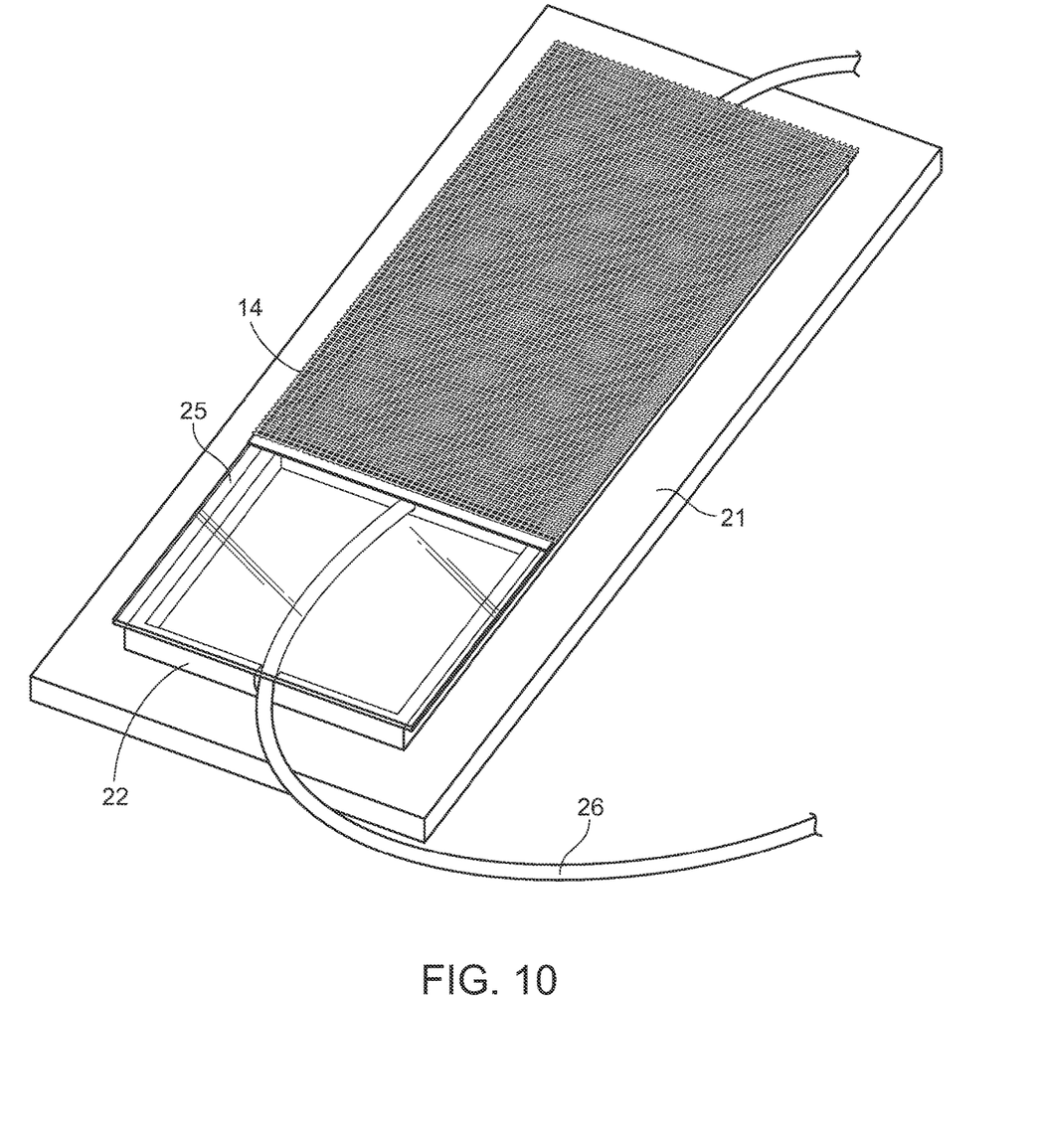
FIG. 10 is a perspective view of an assembled, closed mold body showing tubing for infusing composite matrix material into the mold, usable for making a composite panel in accordance with an example embodiment.

As shown in FIG. 10, when the composite matrix material 12 is introduced into the mold (by way of non-limiting example, infused into the mold by a supply tube 26 coupled to infusion port 23), it flows into the mold, and may be aided in flow by a vacuum tube connected to vacuum port 24 at the end of the mold body opposite the infusion port 23.

Figure 3:
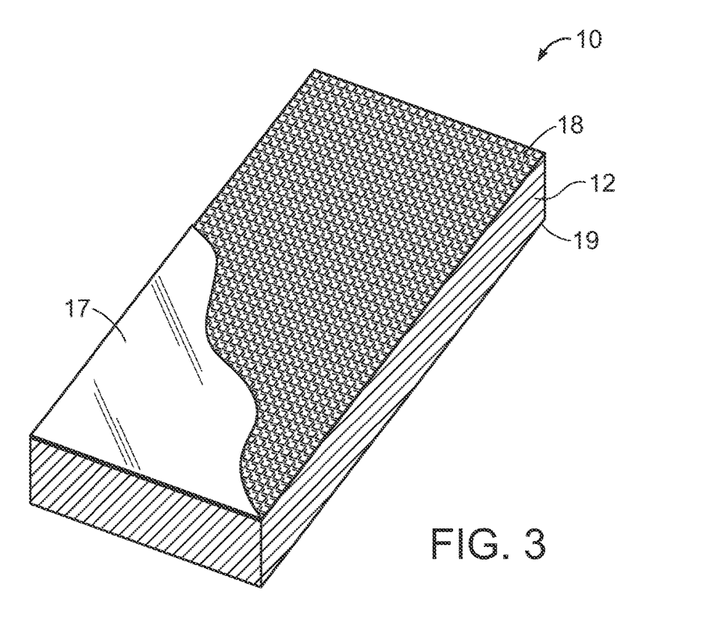
FIG. 3 is a perspective view of a composite product in accordance with an example embodiment.

Thus, the uncured composite matrix material 12 can flow into the mold 20 to all the spaces/voids not occupied by the mold. The composite matrix material 12 will later cure to form a panel or sheet 10, or other molded part, as shown in the example embodiment in FIG. 3. When panels 10 are formed as shown in FIG. 3 (although other shapes and configurations are possible), the outer surfaces of the panel 10 may be substantially parallel.

Once the mold is filled with composite matrix material 12, the infusion or other addition of composite material is stopped and the material is allowed to cure due to elevated pressure, temperature, moisture, time, chemical reaction, etc. If desired for an improved, high-quality finish, or for additional environmental protection, an optional gel coat layer 17 can be applied to one or both exterior surfaces of the panel 10, as shown in FIG. 3.

When the first composite mixture 12 is disposed into a mold 20 with a mesh assembly 14 inside the mold, the first mixture is cured so that the encapsulating prepolymer is polymerized to form a panel, sheet, or block, or molded part of composite core material 12 according to the shape of the mold. Such a molded composite part may also comprise a second mesh assembly 14, placed or installed near a surface or side of the mold opposite the first mesh assembly 14, resulting in a panel or block with a mesh assembly 14 near each major surface 18, 19, of the finished product, as shown in FIG. 11. For example, if a flat, rectangular panel (e.g., shaped like a door) is formed in a mold, the finished product may have mesh reinforcement layers or assemblies 14 near one or two major flat surfaces 18 and 19 of the panel. As also shown in FIG. 11, the final product may have an optional gel coat 17 if desired for a finished, high-gloss surface. Such a gel coat can be applied to either or both surfaces of a panel or sheet.

Further, in step 140, a decision is made as to whether the sheet of the composite core material needs to be scored into a plurality of reinforcing blocks. In certain embodiments, smaller blocks of composite core materials are warranted.

Figure 4:
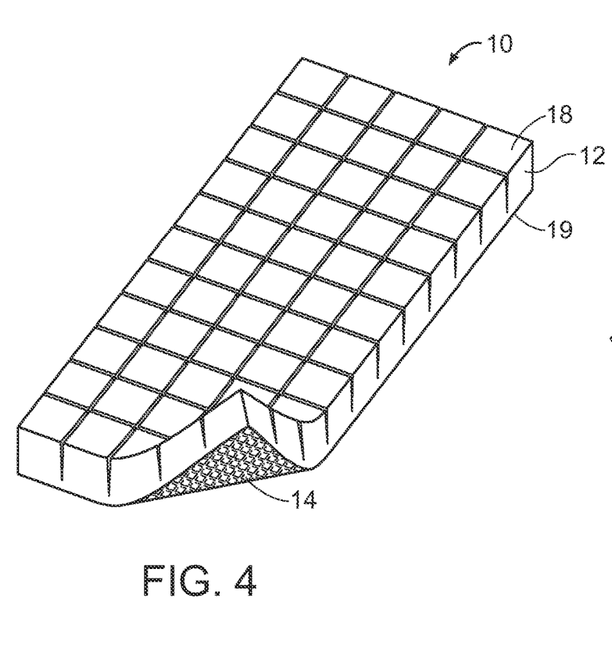
FIG. 4 is a perspective view of the composite core material in accordance with an example embodiment.
Figure 5:
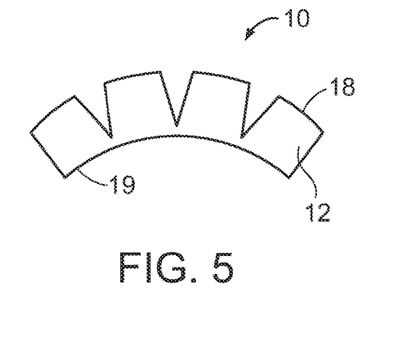
FIG. 5 is an end view of a scored composite core material in accordance with an example embodiment.

In step 150, the sheet 10 of the composite core material 12 may be scored into a plurality of reinforcing blocks, which may in turn be held together by a mesh assembly 14 on a side opposite the scoring, as shown in FIGS. 4 and 5. As shown, a mesh assembly 14 is only formed on one side of the sheet or panel 10. In FIGS. 4 and 5, the mesh assembly 14 is only on or near surface 19, while surface 18 has no mesh assembly, so that it can be scored into reinforcing blocks or sections as shown.

In certain example embodiments, each reinforcing block has a width of about 0.5 inches to about 4 inches and a length of about 0.5 inches to about 4 inches. In addition, in step 160, the sheet of the composite core material may be cut into a plurality of pieces with any desirable length. In other embodiments, the sheet of composite core material is maintained in a solid sheet without scoring in step 152. For convenience of transportation, the sheet of composite core material can be cut into a smaller sheet of 48 inches wide by 48 inches long, 48 inches wide by 96 inches long, or any other width and length according to different requirements.

Figure 2:
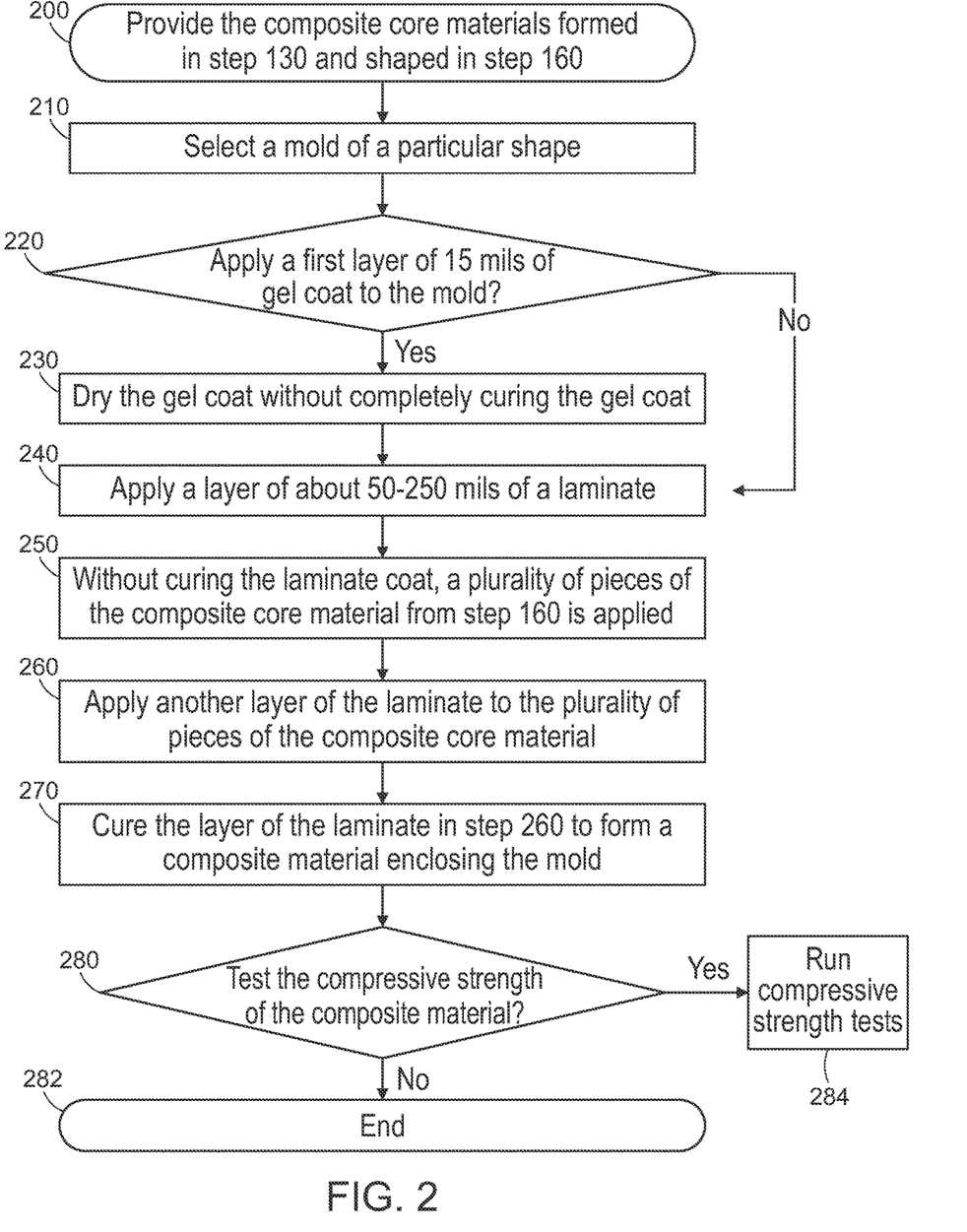
FIG. 2 is a flow chart for forming a composite product with a composite core material in accordance with an example embodiment.

FIG. 2 summarizes an example method for utilizing the composite core material that is described below in certain embodiments in manufacturing appliances, machines, automobiles, and etc. Referring to FIG. 2, in step 200, composite core materials formed in step 130 (FIG. 1) and shaped in step 130 or step 160 (FIG. 1) are provided.

In step 210, a mold of appliances, machines, automobiles, or etc. is provided. For example, if a user would like to build a bathtub incorporating the composite core materials, the user would start with a bathtub mold, i.e., a hollow form or matrix for a particular shape of a bathtub. If a user would like to build a truck bed utilizing the composite core materials, the user would first supply a truck bed mold, i.e., a hollow form or matrix for a particular shape of a truck bed.

After selecting a particular mold, a first layer of gel coat 17 with a polymerization catalyst at a thickness of about 15 mils is optionally applied to the mold in step 220. If a gel coat is not applied, after selecting a mold of a particular shape, a layer of laminate may be applied. As described herein, "mil" is defined as a unit of length equal to about $1/1000$ inch used especially in measuring thickness (as of plastic films). The thickness of the gel coat is not limiting. According to the type of mold selected and strength requirement of the final product, the thickness of the gel coat applied varies accordingly. As a person skilled in the art would appreciate, a gel coat is a material used to provide a high-quality finish on a visible surface of a fiber-reinforced composite. The most common gel coats are based on epoxy or unsaturated polyester resin chemistry.

Gel coats are modified resins which are applied to molds in the liquid state. They are cured to form crosslinked polymers and are subsequently backed with composite polymer matrices, often mixtures of polyester resin and fiberglass or epoxy resin with glass. The manufactured component, when sufficiently cured and removed from the mold, presents the gel-coated surface. In certain embodiments, this is pigmented to provide a colored, glossy surface which improves the aesthetic appearance of the article, such as a counter made with cultured marble.

In some embodiments, the first layer of gel coat is sprayed from a spraying apparatus onto the side of the selected mold from step 210. In other embodiments, the first layer of gel coat is brushed onto the selected mold from step 210. Other applying methods know to a person skilled in the art can be used herein.

In certain embodiments, the polymerization catalyst has a concentration of about 1% to about 2.5% by weight in the mixture of the gel coat and the polymerization catalyst. The weight percentage of the polymerization catalyst can be about 1%, 1.25%, 1.5%, 1.75%, 2%, 2.25%, 2.5% or any other weight percentage that ranges from about 1% to about 2.5%. In step 220, the first gel coat is cured on the side of the mold at a temperature of about 100° C. for about 5 minutes. The particular temperature and the length of time disclosed herein are not limiting, with various different types of gel coat applied, the particular temperature and the length of the time for curing vary accordingly.

Once the gel coat is completely solidified, a first coat of laminate comprising fibers, resins, and a polymerization catalyst may be applied. In certain embodiments, the fibers are selected from the group consisting of fiberglass, carbon fiber, and aramid fibers, and any combinations thereof. In certain embodiments, the resins are selected from the group consisting of polyester resins, vinyl ester resins, epoxy resins, and any combinations thereof.

In certain embodiments, the weight percentage of fibers ranges from about 10% to about 40% and the weight percentage of resins ranges from about 10% to about 70%. In certain embodiments, the polymerization catalyst has a concentration of about 1% to about 2.5% by weight in the mixture of the encapsulating prepolymer and the polymerization catalyst. The weight percentage of the polymerization catalyst can be about 1%, 1.25%, 1.5%, 1.75%, 2%, 2.25%, 2.50% or any other weight percentage that ranges from about 1% to about 2.5%.

In other embodiments, the laminate comprises calcium sulfate and/or hydrates thereof, an encapsulating prepolymer, a polymerization catalyst, and a plurality of fiberglass pieces. In certain embodiments, the third mixture comprises about 40% to 65% of calcium sulfate and/or hydrates thereof, about 60% to 35% of the encapsulating prepolymer, and about 10% to 40% of the plurality of fiberglass pieces. In certain embodiments, the polymerization catalyst has a concentration of about 1% to about 2.5% by weight in the mixture of the encapsulating prepolymer and the polymerization catalyst. The weight percentage of the polymerization catalyst can be about 1%, 1.25%, 1.5%, 1.75%, 2%, 2.25%, or any other weight percentage that ranges from about 1% to about 2.5%.

In step 230, the gel coat is dried without completely curing it. Because the first layer of gel coat is not completely cured but dried, the first layer of gel coat is still sticky to the touch. When applying the second layer of laminate in step 240, the second layer of laminate does not leak through the dried first layer of gel coat. When a gel coat is not applied, a coat of laminate is directly applied to the mold provided in step 210.

In certain embodiments, the second layer of laminate is applied at a thickness of about 50 to 250 mils, although the thickness of the laminate layer is not limiting and other thicknesses are possible. According to the type of mold selected and strength requirement of the final product, the thickness of the laminate layer applied varies accordingly. Further, to ensure even application of the laminate layer, a suitable appliance may be used to roll out any possible bubbles presented in the laminate layer.

In step 250, without solidifying the laminate layer in step 240, applying a plurality of pieces of the composite core materials from step 160 to the uncured laminate layer. Depends on different types of molds, sheets of the composite core materials or different shapes of the composite core materials from step 130 can applied to the uncured laminate layer. However, the thickness of the composite core material is not limiting. According to the type of mold selected and strength requirement of the final product, the thickness of the composite core material applied varies accordingly.

After applying pieces of the composite core material, another layer of the laminate is applied to pieces of composite core material in step 260. This layer of laminate has the same composition as the laminate layer described in step 240. In certain embodiments, the thickness of the laminate layer in step 260 is about 50 to about 250 mil. Similarly, the thickness of the laminate layer is not limiting. According to the type of mold selected and strength requirement of the final product, the thickness of the laminate layer applied varies accordingly. After curing the second layer of laminate in step 260, a composite product incorporating the composite core materials is formed in step 270. The formed composite product encloses the mold selected in step 210.

Further, in step 280, a decision is made whether a compressive strength testing is needed on the piece of the composite material. If yes, step 280 transitions to step 284, one or more compressive strength tests will be carried out. If no, step 280 transitions to step 282. As described herein, compressive strength or compression strength is the capacity of a material or structure to withstand compressive loads, as opposed to tensile strength, which withstands loads tending to elongate. In other words, compressive strength resists compression (being pushed together), whereas tensile strength resists tension (being pulled apart). In the study of strength of materials, tensile strength, compressive strength, and shear strength can be analyzed independently.

Example 1

A resin absorption test was performed on the composite material formed in step 250. As shown in Table 1 below,

TABLE 1

Resin absorption for the composite material formed in step 250 vs. Balsa core.

|  | Current disclosed composite core | Balsa Core |
|---|---|---|
| % Resin absorption by weight | 1.6% | 75.9% |
| Calculated dry density g/cc | 0.78 | 0.14 |
| Calculated resin-saturated density g/cc | 0.79 | 0.29 |

E. Operation of Preferred Embodiment

As discussed above, example embodiments disclosed may be used to create lightweight, very strong panels or sheets that are highly resistant to rot, moisture, mold, etc. Such panels or sheets also provide good insulation and noise reduction, which is enhanced due to the microspheres encapsulated in the resin mixture. Microspheres, such as hollow microspheres, have good sound and thermal insulation properties due to their hollow structure. The example embodiments disclosed herein may be used to create substantially rigid flat or curved panels or sheets. For example, flat and curved panels or molded parts can be made using the microsphere mixture with a mesh assembly, such as fiberglass scrim, on the major surfaces of the parts. Such panels or parts are typically stronger than wood, for example, and have good rigidity and environmental characteristics as well, as discussed above.

The composite core material, such as a scored panel (of virtually any size and shape) may be used for reinforcement where conformance to an irregular surface or parts is desired. Obviously, a flat composite panel cannot be used advantageously to reinforce a curved surface, or an area with a pipe or other structures. Many such areas might be found, for example, in interior areas and spaces of boats, aircraft, RVs, etc. Panels 10 made according to the example methods described here can be scored on a side opposite of the mesh assembly, (see FIG. 4) to a depth near the mesh assembly 14. In such an example embodiment, the mesh layer will serve to hold the scored blocks together. Due to the scoring, a composite panel 10 can be made to curve around a surface if desired, by placing the side with the mesh against a convex surface or part of a surface, so that the scores will open, as shown in FIG. 5

If a panel 10 of composite material is scored to create smaller scored sections, the resulting panel can be made to curve around a convex surface with a smaller radius. Accordingly, a user may desire and specify scoring having a particular spacing, depending on the application. In addition, the scoring of a panel or sheet does not need to be symmetrical, so again, the final shape of the area to be reinforced, if known, can be used to create an optimal scoring pattern to result in a high-strength, lightweight final structure.

To reinforce, for example, a flat interior area with a pipe passing through it, the area to be reinforced may be coated or sprayed with a resin. For example, the same type of resin the scored composite part is made of may be used. Using the same type of resin will typically create a very good chemical bond, so that the resulting reinforced structure acts as though it is a single, solid piece. Next, the mesh side 19 of the panel 10 may be placed against the surface and the pipe or structure, and the "scores" of the panel can open wider to allow the panel 10 to wrap around and generally conform to the pipe (or any such irregular surface). After a panel 10 is installed in this manner, additional resin or material can be applied (such as sprayed, chopped fiberglass with resin) to fill in the open, scored sections of the panel, again with the same type of resin from which the panel is made, to ensure strong chemical bonding.

Unless otherwise defined, all technical and scientific terms used herein have the same meaning as commonly understood by one of ordinary skill in the art to which this invention belongs. Although methods and materials similar to or equivalent to those described herein can be used in the practice or testing of the composition and method to form a composite core material, suitable methods and materials are described above. All publications, patent applications, patents, and other references mentioned herein are incorporated by reference in their entirety to the extent allowed by applicable law and regulations. The composition and method to form a composite core material may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A method of attaching a panel to an object having an irregularly-shaped surface for reinforcement of the object, wherein the panel comprises a first side having a mesh assembly and a second side opposite the first side having a plurality of scores, the method comprising:
    applying a first resin material to the irregularly-shaped surface or to the first side of the panel;
    placing the first side of the panel against the irregularly-shaped surface such that the plurality of scores open wider to allow the panel to conform to the irregularly-shaped surface; and
    applying a second resin material to the second side of the panel to fill in the plurality of scores.

2. The method of claim 1, wherein the irregularly-shaped surface comprises a convex surface.

3. The method of claim 1, wherein the panel comprises a resin, and wherein the first resin material is the same as the resin.

4. The method of claim 1, wherein the panel comprises a resin, and wherein the first resin material and the second resin material are the same as the resin.

5. The method of claim 1, wherein the panel comprises a plurality of microspheres disposed in a resin.

6. The method of claim 5, wherein the plurality of microspheres comprise plastic microspheres, glass microspheres, ceramic microspheres, polyvinyl chloride (PVC) microspheres, or acrylic microspheres, or any combinations thereof.

7. The method of claim 6, wherein the plurality of microspheres are hollow.

8. The method of claim 1, wherein the second resin material comprises a plurality of chopped fiberglass mixed with a resin.

9. The method of claim 1, wherein applying the second resin material comprises spraying the second resin material.

10. The method of claim 1, wherein the first side of the panel is parallel to the second side of the panel before the first side of the panel is placed against the irregularly-shaped surface.

11. A method of attaching a panel to an object having an irregularly-shaped surface for reinforcement of the object, wherein the panel comprises a first side having a mesh assembly and a second side opposite the first side, the method comprising:
    scoring the second side of the panel to create a plurality of scores, wherein scoring the second side creates a plurality of reinforcing blocks on the second side of the panel;
    applying a first resin material to the irregularly-shaped surface or to the first side of the panel;
    placing the first side against the irregularly-shaped surface such that the plurality of scores open wider, to allow the panel to conform to the irregularly-shaped surface; and
    applying a second resin material to the second side of the panel to fill in the plurality of scores.

12. The method of claim 11, wherein scoring the second side of the panel comprises scoring in at least two different directions, such that the plurality of scores intersect each other.

13. The method of claim 12, wherein the plurality of reinforcing blocks are produced by scoring the second side of the panel in multiple rectangles.

14. The method of claim 12, wherein the mesh assembly holds the plurality of reinforcing blocks together.

15. The method of claim 11, wherein the mesh assembly is not scored.

16. The method of claim 11, wherein the irregularly-shaped surface comprises a convex surface.

17. The method of claim 11, wherein the panel comprises a resin, and wherein the first resin material is the same as the resin.

18. The method of claim 11, wherein the panel comprises a resin, and wherein the first resin material and the second resin material are the same as the resin.

19. The method of claim 11, wherein the panel comprises a plurality of microspheres disposed in a continuous encapsulating resin mixture.

20. A method of attaching a panel to an object comprising a convex surface, the method comprising:
    forming a mixture comprising microspheres, an encapsulating prepolymer, and a polymerization catalyst;
    shaping the mixture into a panel shape by disposing the mixture onto a mesh assembly;
    polymerizing the encapsulating prepolymer to form the panel, the panel comprising a plurality of microspheres disposed in a resin, wherein the panel comprises a first side having a mesh assembly and a second side opposite the first side;
    scoring the second side of the panel to create a plurality of scores in the panel in at least two different directions, such that the plurality of scores intersect each other, wherein scoring the second side of the panel creates a plurality of reinforcing blocks on the second side of the panel, wherein the mesh assembly is not scored;
    applying a first resin material to the object or to the first side of the panel;
    placing the first side against the object such that the plurality of scores open wider, to allow the panel to conform to the convex surface; and
    applying a second resin material to the second side to fill in the plurality of scores;

wherein the first resin material and the second resin material are the same as the resin.

* * * * *